Patented Jan. 3, 1933

1,893,138

UNITED STATES PATENT OFFICE

WRIGHT W. GARY, OF BEVERLY HILLS, CALIFORNIA, ASSIGNOR OF ONE-HALF TO CHARLES C. MIDDLETON, OF BEVERLY HILLS, CALIFORNIA

PROCESS OF TREATING PETROLEUM

No Drawing.  Application filed July 16, 1928.  Serial No. 293,084.

This invention relates to the treatment of petroleum in order to separate therefrom more particularly the sulfur compounds, and to stabilize and improve the petroleum.

Heretofore in the treatment of petroleum with sulfuric acids and the like, reaction products in the form of sludges, have been formed which were of such gummy, resinous and aciduous nature as to hinder, if not prevent, filtration by the usual filter mediums employed for that purpose; this was for the reason that the reaction products were deposited on the blanket, or other filtering medium, in the form of a gummy, semiliquid, or impervious mass, which hindered if not prevented passage of the filtrate therethrough. In some cases filter aids, such as clay or the like, were resorted to to improve the filtration; this is not only, however, expensive from an operating standpoint, but also reduces the yield by absorption of the petroleum by the filter aid. Moreover, the time required for separating is not only extended but there is a tendency for impurities to become dissolved by the petroleum.

In my Patent No. 1,677,440, July 17, 1928, the petroleum is contacted with sulfuric anhydride, more particularly for the purpose of removing sulfur compounds or stabilizing and improving the petroleum. In the particular embodiments described in the specification, the sulfuric anhydride is maintained in a dry and gaseous state, and in accordance with one of these embodiments, the temperature is maintained above the condensation point of the treating gas and below the dehydrogenation temperature of the petroleum.

I have discovered that in the treatment of petroleum and more particularly those products in the lubricating series, with sulfuric anhydride, that the reaction products are sufficiently pervious or porous that they may be separated by filtration; these reaction products being of a sufficiently definite structure to avoid the formation of impervious masses on the filtering mediums so that it will not be necessary to employ filter aids.

One of the objects of this invention, therefore, is to provide a process of treating petroleum whereby upon contacting of the same with sulfuric anhydride there are produced filterable reaction products which are separated from the petroleum by filtration.

Further objects will appear from the detail description, in which will be set forth several embodiments of this invention; it will be understood, however, that this invention is susceptible of various embodiments other than those described and referred to, without departing from the spirit of this invention.

In accordance with one embodiment of this invention, the petroleum is contacted with sulfuric anhydride maintained in a dry and gaseous state as described in Patent No. 1,677,440. The sulfuric anhydride may be diluted with a suitable medium, such as air, as described in the patent, and the temperature may be maintained above the condensation point of the treating gas or gas mixture, and below the dehydrogenation point of the petroleum. The treated petroleum may then be subjected to filtering in order to separate the reaction products. This is possible for the reason that these reaction products are pervious or sufficiently solid as to permit passage of the filtrate through the filtering medium without the formation of a gummy mass clogging the filter. The apparatus for subjecting the petroleum to contact with the sulfuric anhydride may be of any suitable form, such as described in the patent referred to, and the filtering apparatus may be of any suitable form well known to those skilled in the art; further detail description will, therefore, be unnecessary.

In accordance with another embodiment of this invention, more particularly described in application, Serial No. 293,086 executed and filed of even date herewith, the petroleum is contacted with concentrated or undiluted sulfuric anhydride by passing the same into the body of the petroleum preferably while the same is agitated. In such a case the temperature of the petroleum need not be maintained above the condensation point of the sulfuric anhydride, although the petroleum product may, in some cases, require heating in order to obtain the desired fluidity for treatment. The separation of the reaction products from the petroleum may be secured by filtering in the same manner as heretofore described.

In application, Serial No. 293,087, executed and filed of even date herewith, other embodiments of this invention are described in which the petroleum is contacted with liquid sulfuric trioxide by passing the same into the body of the petroleum while agitated or circulated, the petroleum being also in some cases, heated, in order to obtain the desired fluidity for treatment. Although as a general rule, it is contemplated to employ liquid sulfuric anhydride in a substantially concentrated form, it often occurs, however, that the conditions are such that it is extremely advantageous to dilute the liquid sulfuric anhydride by the addition of diluents. For this purpose suitable diluents are liquid sulfur dioxide, liquid carbon dioxide and carbazol. By the use of such diluents, the concentration of the liquid sulfuric anhydride may be reduced to a sufficient point where ordinary agitation methods can be employed with or without pressure, depending upon the nature of the diluent. The effect of diluting the sulfuric anhydride is to cause a slow or retarded reaction which will prevent overheating of the petroleum under treatment, even at the contacting zone. Accordingly, special precautions for securing rapid distribution of the sulfuric anhydride through the body of the petroleum under treatment need not necessarily be taken. The diluent may be combined with the sulfuric anhydride in any suitable manner, as by bringing them together at or before contact with the petroleum takes place. Where liquid sulfur dioxide is used as a diluent, conditions can be maintained to cause the sulfur dioxide to remove such compounds as desired, and these are carried with the reaction products resulting from the contact of the sulfuric anhydride and removed therewith. After removal of the reaction and absorbed products, the diluent especially sulfur dioxide or carbon dioxide may be separated by volatilization or otherwise. The separation of the reaction products from the petroleum may be secured by filtering in the same manner as heretofore described.

It will, therefore, be seen that the invention accomplishes its objects, for by the processes described the reaction products may be separated from the petroleum in a simple, convenient and effective manner. While the filtering may be accomplished without filter aids, in some cases it may be desirable to employ such aids, however, on account of the previous treatment with sulfuric anhydride and due to the resultant character of the reaction products formed, the quantity or quality of the filter aid can be considerably reduced, thereby resulting not only in a saving in the quantity of the aid required, but also in the quantity of the filtrate retained by the aid. It will, furthermore, be understood that previous to filtering the partial separation may be preliminarily secured by settling of a substantial quantity of the reaction products. In accordance with this invention, however, the oil insoluble reaction products are removed from the treated oil so that they will not remain in the filtrate; and on account of the ease and rapidity of filtration these reaction products are removed before detrimental chemical reactions can take place.

While the processes embodying this invention are particularly applicable to the treatment of petroleum of the lubricating series, it will be understood that this invention is applicable in many cases to other petroleum products and petroleum in general. Furthermore, while certain theories have been advanced, it will be understood that these have been advanced for the purpose of facilitating the disclosure and not as being absolutely essential or necessary; it is, therefore, to be understood that this invention is not to be limited to any particular theory of operation. It is also obvious that various changes may be made in details without departing from the spirit of this invention; it is therefore, to be understood, that this invention is not to be limited to the specific details described.

Having thus described the invention, what is claimed is:

1. The process of treating petroleum comprising, diluting sulphuric anhydride with liquid carbon dioxide, contacting the petroleum with the diluted anhydride so as to produce filterable reaction products, and separating the same by filtration.

2. The process of treating petroleum, comprising, passing therethrough sulfuric anhydride mixed with carbon dioxide as a diluent.

3. The process of treating petroleum, comprising, passing therethrough liquid sulfuric anhydride diluted with liquid carbon dioxide.

In testimony whereof I affix my signature this 27th day of June, 1928.

WRIGHT W. GARY.